Figure 1:
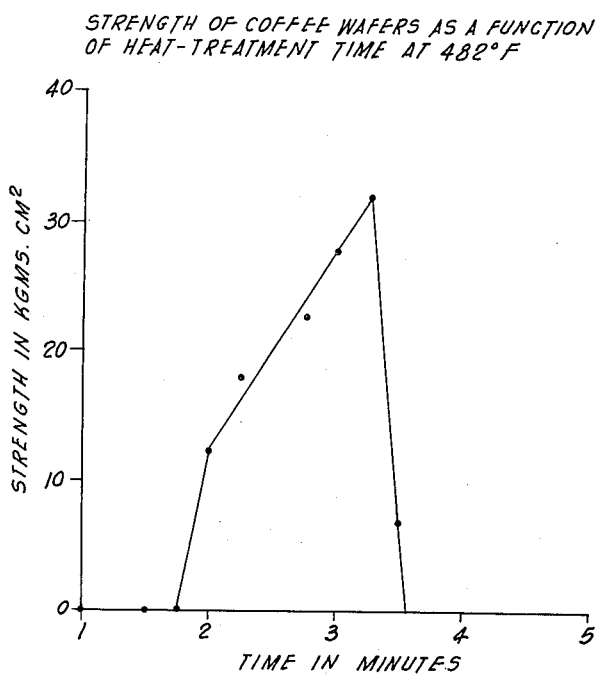

INVENTOR.
LEE P. BISHOP

United States Patent Office 3,071,470
Patented Jan. 1, 1963

3,071,470
METHOD FOR PREPARING SOLUBLE
COFFEE WAFERS
Lee Porter Bishop, 1960 Olive St., Eugene, Oreg.
Filed Dec. 24, 1959, Ser. No. 862,014
5 Claims. (Cl. 99—66)

This invention relates to a method for the preparation of a water-soluble coffee wafer.

Instant coffee, now a well known commercial product, is prepared by producing an aqueous infusion of the water-soluble constituents of coffee beans which have been roasted and ground, and then spray drying this aqueous infusion to produce a dry powder. This dry powder is readily soluble in water and can be dissolved in hot water to produce a palatable beverage coffee closely approximating that produced directly from the roasted and ground coffee beans. In this specification and in the appended claims, the term "instant coffee" will be used in this usual sense of meaning the water-soluble constituents of the roasted coffee bean in dried form.

Instant coffee has received wide acceptance because of the fact that it is more convenient and less time consuming to use in the preparation of a coffee beverage, than the original roasted and ground coffee beans. However, instant coffee powder must be measured in the production of a beverage coffee and its powdered form causes considerable waste due to spillage and to its tendency to cling to the interior of its package, particularly in humid weather.

A tablet or wafer of instant coffee carrying the correct amount of the coffee extract to produce a palatable cup of beverage coffee avoids the disadvantages inherent in the powdered form of the usual commercial instant coffee. However, attempts to produce tablets of instant coffee by the use of the usual tabletting techniques has revealed major difficulties arising from two sources. The granules of the powdered instant coffee do not adhere readily to form a coherent strong tablet which can be handled without breakage and disintegration. Efforts to overcome this difficulty by the use of unusually high tabletting pressures have not been wholly successful and in any case have been impractical due to the fact that a highly compressed tablet of instant coffee dissolves quite slowly in water and, hence, the tablet loses one of the most advantageous properties of the powdered instant coffee. Efforts to overcome this difficulty by the addition of adhesive materials to the instant coffee have not been particularly successful in solving the problem of tablet fragility and have introduced new problems arising from adverse effects of the adhesive materials on the flavor of the beverage coffee.

The second source of difficulty which has been encountered in the production of tablets of instant coffee has been an inherent tendency of the instant coffee to stick to the molds of a tabletting machine. This is a tendency which is increased by many of the adhesive agents which are possibilities for increasing the strength of the tablets. Attempts to overcome this problem of sticking to the molds by the admixture of mold lubricants with the instant coffee have encountered serious difficulties arising from the undesirable effect of the mold lubricant on the final beverage coffee from the standpoint of flavor, or of water insoluble material in the beverage or both.

It is the object of this invention to avoid the foregoing difficulties which have been encountered in the production of tablets or wafers of instant coffee and to provide a tablet or wafer of instant coffee which is physically strong, which is freely soluble in hot water and which contains no foreign material, such as, adhesive agents or mold lubricants which can adversely affect the flavor of the beverage coffee prepared from the tablets or wafers.

Another object of this invention is to provide a method for the production of tablets or wafers of instant coffee which are rapid, efficient and inexpensive.

Other objects of this invention and its various advantageous features will become apparent as this description proceeds.

This invention is the result of my research on instant coffee which has revealed the fact that upon heating powdered instant coffee to an elevated temperature above about 350° F. under carefully controlled conditions, it can be fused before it undergoes thermal decomposition and chars. Further, it has revealed that the beginning of thermal decomposition at temperatures above 350° F. is a function of time as well as of temperature. Of most importance, this research has demonstrated that instant coffee can be carefully fused while avoiding any substantial thermal decomposition and cooled to produce a porous solid of substantial physical strength which is readily soluble in hot water and which, upon solution in hot water, produces a palatable beverage coffee.

The coffee tablet or wafer produced by the method in accordance with this invention is a porous, solid body of the water-soluble constituents of coffee beans which have been fused without any substantial thermal decomposition. It is soluble in hot water and which when dissolved in hot water produces a palatable beverage coffee. The exact shape of this porous solid body of instant coffee is immaterial. However, it is preferably one which has a high ratio of surface to volume which permits the rapid solution of the coffee in hot water. As a matter of convenience in manufacture, I prefer to produce the porous, solid bodies in the form of relatively thin sheets which may have a perimeter of any desired shape.

The weight of each of these solid bodies of instant coffee will desirably be that, which upon solution in hot water will produce a six-ounce cup of beverage coffee which is palatable to the average taste, a substantial fraction thereof or a small multiple thereof. It will, of course, be appreciated that both the capacity of coffee cups vary and the preferences of various individuals differs materially as to the most palatable strength for beverage coffee, so it is impossible to establish an exact weight for these solid bodies of instant coffee which, for convenience, I will refer to hereinafter as "coffee wafers."

In the preparation of beverage coffee by the use of powdered instant coffee, the majority of people use at least a level standard teaspoon of the coffee in a six ounce cup. Table I presented hereinafter in this specification shows that the bulk densities of five different leading brands of instant coffee differ materially with the average weight of a level teaspoon ranging from 0.97 gram to 1.27 grams. One gram of instant coffee produces a wafer weighing 0.84 gram, and I have found that wafers falling within the range of about 0.75 gram to about 2.0 grams will satisfy almost any taste. As a practical matter, I prefer to fix the weight of my wafers to satisfy the preference of the majority of people in the areas in which they are to be consumed.

Preferences as to the strength of beverage coffee frequently vary even within one family. To give the consumers flexibility in the preparation of beverage coffee of the exact strength desired, I find that it is desirable to provide lines of weakness in each individual wafer which will permit the user to break the wafer into fractions, such as, for example, halves or fourths and use either a fraction of a wafer or a whole wafer and a fraction of another in the preparation of a cup of coffee. Such lines of weakness to facilitate the fracture of a wafer, for example, into fourths, can be provided in the case of a wafer having a square, rectangular or circular perimeter by symmetrically positioned scores or shallow troughs crossing its surface at right angles to each other. Such scores can readily be cut on the surface of the wafers while they are hot since they are then plastic. When at room temperature, the wafers can readily be fractured along the scored lines since they are hard and somewhat brittle.

By an alternative embodiment of this invention, I obtain flexibility in the use of the coffee wafers to prepare beverage coffee of different strengths by providing wafers which carry a fraction of the amount of instant coffee required to produce a cup of coffee which is palatable to the average individual. One or an desired plurality of such wafers may be used in the preparation of a cup of coffee.

By still another embodiment of this invention, I produce wafers which carry an amount of instant coffee sufficient for the preparation of a plurality of cups of coffee. Such wafers may, for example, be of a weight which will produce a pot of, for example, four, six or eight cups of coffee. I prefer to provide such large wafers with scored lines, as described hereinbefore to enable them to be fractured into segments suitable, for example, for the production of single cups of coffee. These wafers may be of a weight which is a multiple of a weight within the range of about 0.75 to about 2.0 grams and be scored in locations such that when the wafer is broken into segments along the score lines, each segment has a weight within the range of about 0.75 to about 2.0 grams.

By the method, in accordance with this invention, a body of powdered, solid water soluble constituents of coffee beans (instant coffee) is placed in a mold and heated to an elevated temperature above its fusion temperature of about 350° F. and held at that temperature for a period of time sufficient to permit the coffee granules to fuse but insufficient to permit material thermal decomposition of the instant coffee as shown by first a puffing of the body of the material and ultimately by its charring. The period of time which the instant coffee is held at the maximum temperature must be decreased as the maximum temperature is set higher to avoid excessive thermal decomposition of the material. I have found that at temperatures above about 350° F. that a decrease of one minute in the time of heat treatment will compensate for an increase of about 47° F. in the maximum temperature used in the heat-treatment. As a practical matter, the maximum treating temperature should not exceed about 550° F., when using an ordinary oven, since at higher temperatures the time of treatment becomes so short that the powder is not uniformly heated throughout. Stated in another way, it is desirable to set the heat treating temperature at a point which requires a heat treating time of at least two minutes. However, higher temperatures and shorter times may be used when dielectric heating is employed since this type of heating gives a uniform increase in temperature throughout the body of the coffee powder. The time-temperature relationships for different brands of instant coffee are specifically illustrated by Table II presented below.

It is desirable that the instant coffee wafers produced by the method of this invention should be of maximum strength to avoid unintentional breakage or crumbling in handling. My research has demonstrated that the strength of the wafers increases up to the point of incipient puffing during the heat treatment and then falls off rapidly. Thus, either insufficient or excessive heat treatment yields weak wafers. The wafers become brittle, but less subject to abrasion as they become stronger as measured by compressive strength. This brittleness is an advantage in the case of wafers provided with scored lines of weakness since it permits them to be readily and cleanly fractured in the fingers. It does not progress to the extent of rendering the wafers subject to breakage and disintegration during ordinary handling.

The mold used in carrying out the method of this invention may be made of any suitable structural metal. Direct comparisons between steel, tin-plated steel and aluminum have shown that the effective heat transfer through aluminum is poorer than through steel so that longer heat treatments are required when using aluminum. Furthermore, when using aluminum, the tops of the wafers reach their optimum heat treatment while their lower portions are still undertreated. This does not occur with either the tin-plated steel or steel. For this reason, steel is preferred as a mold material.

The heat treated product is readily released from the mold. Although it is malleable when hot, it sets up quite rapidly when removed from the heating zone and can be removed from the molds while still hot. Also, it can be handled and packed while still hot, so that it is unnecessary to cool it before it is packaged.

Although, the heat treated product is readily released by a steel, tin-plated steel or aluminum mold, when either hot or cold, the mold surface retains a film of the coffee after the load is released. It is desirable to remove this film before the mold is re-used by brushing or, preferably, by washing before the mold is re-used. However, this retention of a film of the coffee on a steel mold can be largely eliminated by the treatment of the surface of the mold with a silicone resin such as, for example, dimethyl polysiloxane. Such treatment is sometimes termed "pan-glazing." This treatment both facilitates the release of the load from the mold and leaves the surface of the mold largely free of coffee. Any residual coffee remaining on the surface of a silicone-treated steel mold can be removed, for example, by blowing it with compressed air.

During the heat-treatment by the method of this invention, the instant coffee loses approximately 16% of its weight. After the heat-treatment, the coffee wafers will regain approximately 8% of their weight by absorption of moisture from the air. They reach an equilibrium after about 30 hours and their moisture content then fluctuates with variations in the relative humidity of the air. The wafers display only the slightest tackiness after reaching their equilibrium moisture content and do not stick together unless held together under pressure for several hours. Even under such conditions, the wafers which had stuck together can be easily separated. This behavior upon exposure to atmospheric humidity makes unnecessary the use of a moisture-barrier type of package. However, it is preferable to use such a package, since even the slightest stickiness is undesirable in the case of a product of this type.

In carrying out this method on a practical scale, I may use either of two different techniques. I may use a plurality of small molds, each of which produces a wafer of the desired size. In the use of such molds, an amount of powdered instant coffee within the range of about 1.75 grams to about 2.0 grams is placed in each mold to produce wafers having weights within the range of about 0.9 gram to about 2.4 grams after the loss of about 16% of the weight of the material which takes place during the heat treatment. After the heat treatment, these molds.

are inverted to allow the coffe wafers to fall out of the mold. If necessary the molds are tapped to secure the release of the wafers from the mold surface.

By the alternative technique, a relatively large mold having a flat bottom and square or rectangular sides is used. In the use of this mold an amount of the instant coffee powder which is an even multiple of a weight within the range of about 0.9 gram to about 2.4 grams is placed in the mold and distributed as a layer of uniform thickness over the bottom of the mold. After the heat treatment, and while the sheet of fused instant coffee is still plastic a series of equally spaced parallel grooves are cut in the surface of the sheet in parallel alignment to one of the sides of the mold and a second series of equally spaced parallel grooves cut at right angles to the first series of grooves. These grooves are in number and in locations such that they subdivide the surface of the sheet into the same number of equal areas that the original weight of the powder was a multiple of a weight within the range of about 0.9 gram to about 2.4 grams. This sheet is then removed from the mold, by inverting the mold and if necessary tapping it on the bottom to cause the release of the sheet. After this sheet has cooled sufficiently to harden, it is broken into segments along the grooves in its surface.

In the use of either of these techniques, I prefer to pass the molds through a tunnel furnace, maintained at the desired heat treating temperature at a speed which exposes each mold to the oven temperature for the period of time determined by the oven temperature as described hereinbefore.

The products and the method in accordance with this invention are specifically illustrated by the examples which follow:

EXAMPLE I

A series of five different brands of commercially available instant coffee were subjected to heat treatment to determine the optimum time temperature combinations for heat treating each brand and to compare the strengths of the wafers produced under optimum conditions of treatment. In the heat treatments, one level teaspoon of the instant coffee was transferred to a mold of a multiple aluminum mold containing twelve depressions each 33 mm. in diameter. The various brands of instant coffees were found to differ in their bulk densities as shown by the average weight per teaspoon given in Table I.

TABLE I

*Comparative Bulk Densities of Instant Coffees Processed*

Brand:                  Ave. wt. per standard teaspoon, grams.
- Nescafe (Nestle Co., Inc.) _____ 1.17
- Folgers (J. A. Folger & Co.) _____ 1.27
- Chase & Sanborn (Standard Brands Inc.) ____ 1.07
- Bordens (The Borden Co.) _____ 1.20
- Maxwell House (General Foods Corp.) _____ 0.97

The mold was then swirled to give a flat surface to each coffee charge. This mold was then placed in a thermostatically controlled oven which was at a predetermined temperature and left in the oven for a predetermined period of time, after which it was cooled at 40° F. The mold was then inverted and tapped, when necessary, to release the wafers. The wafers were then stored in closed glass containers until tested for strength and solubility.

The strength of the wafers was measured by subjecting them to a gradually increasing compressive load until they were crushed. Wafers were prepared from each of the brands of instant coffee listed in Table I using different time-temperature conditions and tested for compressive strength until the time-temperature conditions which gave the maximum wafer strength with each brand of instant coffee were established. The optimum heat treating conditions and the maximum wafer strengths which were obtained under those conditions, are given in Table II.

TABLE II

*Optimum Heat-Treating Conditions and Maximum Wafer Strengths Obtained With Different Brands of Instant Coffee*

| Product | Time, Minutes | Temp., °F. | Strength (kgm./cm.²) |
|---|---|---|---|
| Nescafe | 2 | 486 | 18.1 |
|  | 3 | 437 | 18.1 |
|  | 4 | 394 | 18.1 |
| Folgers | 2 | 525 | 24.6 |
|  | 3 | 482 | 24.6 |
|  | 4 | 437 | 24.6 |
| Chase & Sanborn | 2 | 503 | 17.3 |
|  | 3 | 453 | 17.3 |
|  | 4 | 403 | 17.3 |
| Bordens | 2 | 518 | 25.5 |
|  | 3 | 573 | 25.5 |
|  | 4 | 419 | 25.5 |
| Maxwell House | 2 | 507 | 22.9 |
|  | 3 | 464 | 22.9 |
|  | 4 | 432 | 22.9 |

It will be noted from the data of Table II, that there was considerable variation between the different brands of instant coffee as to both the maximum temperatures which could be used for a specified time and the maximum wafer strength obtained. It will be noted that the treatment temperatures when using a treatment time of two minutes ranged from 486° F. to 525° F. Further, it will be noted that in the case of each of the brands that there is a complete correlation of an inverse relationship between the time of treatment and the maximum temperature of treatment. In each case the shorter the time of treatment, the higher the maximum temperature which could be used.

Table III presents data, obtained as described in Example I, showing the optimum heat treatment times at 500° F. and the change in temperature required to compensate for each minute change in time.

TABLE III

*Optimum Heat-Treatment Times at 500° F., and the Change in Temperature Required to Compensate for Each Minute Change in Time*

| Product | Optimum Time, Minutes at 500° F. | Change in Temp., °F./Minute |
|---|---|---|
| Nescafe | 2.3 | 46 |
| Folgers | 2.6 | 45 |
| Chase & Sanborn | 2.1 | 52 |
| Bordens | 2.5 | 53 |
| Maxwell House | 2.1 | 38 |
| Average | 2.3(±0.2) | 47(±5.) |

The changes in temperature listed in Table III are decreases in temperature with increases in the time of treatment.

Table IV presents data obtained as described in Example I showing the effect of the time of the heat treatment of the particular brand of instant coffee which as shown by the data of Table II gave the strongest wafers.

TABLE IV

*Effect of Time of Heat Treatment at 482° F. on Wafer Strength (Bordens)*

Time, minutes:                 Strength, kgms./cm.²
- 1 _____ 0.0
- 1.5 _____ 0.0
- 1.75 _____ 0.0

TABLE IV.—Continued

*Effect of Time of Heat Treatment at 482° F. on Wafer Strength (Bordens)—Continued*

| Time, minutes: | Strength, kgms./cm.² |
|---|---|
| 2.0 | 12.0 |
| 2.25 | 18.0 |
| 2.75 | 22.9 |
| 3.0 | 27.9 |
| 3.25 | 32.0 |
| 3.5 | 7.0 |
| 4 | Puffed and charred |
| 5 | Puffed and charred |

The data of Table IV, which is presented graphically by FIGURE 1, demonstrates the critical nature of the time-temperature relationship in the method of this invention even more precisely than that of the preceding tables. It will be noted from this data that the wafers only started to develop strength after two minutes even at the relatively high temperature of 482° F. During the next 1.25 minutes the strength increased to a maximum, and then dropped quite sharply in the next 0.25 minute while thermal decomposition was beginning.

The critical nature of this time-temperature relationship is emphasized by a comparison of the data of Table II with that presented by Table IV and by FIGURE 1. In the data of Table II, time intervals of one minute were used to study the effect of different temperatures. The maximum strength obtained at each of three different temperatures, 507° F., 464° F. and 432° F. in 2, 3 and 4 minutes, respectively, using the same brand of instant coffee used to obtain the data of Table IV and FIGURE 1 was 22.9 kgm./cm.², while the materially higher maximum of 32.0 kgm./cm.² was obtained at 482° F. by the precise timing to 3.25 minutes of the data of Table IV and FIGURE 1.

EXAMPLE II

*Effect of the Mold Material on the Release of Heat Treated Instant Coffee*

Four pans of tin-plated steel, aluminum, steel and steel treated, respectively, were used as the bottom for molds, the sides of which were made of a frame fabricated from steel bar which gave a mold having an area 7.7 inches square and one-quarter inch deep and provided an upper surface over which a leveling bar could be passed to level the contents of the mold. Approximately fifty grams of instant coffee (Nescafe) were placed in each of these molds and leveled with the leveling bar. Each of these molds was placed in a thermostatically controlled oven at a temperature of 400° F. for optimum times just short of that which causes a puffing of the product. The optimum time for the heat treatment of each mold was determined by trial and error. Each mold was then withdrawn from the oven and each of the resulting sheets of solid, but malleable instant coffee scored by the use of a scoring guide to outline a total of forty-nine squares on the surface of the sheet, each having a dimension of 1.1 inches in each direction. The frame was then removed from the sheet and the pan inverted. When necessary, the pan was tapped gently to cause the release of the instant coffee sheet. The sheet was then broken into unit wafers, breaking the sheet along each of the score marks in its surface. The dimensions of each wafer before heat treatment and cooling was ¼ x 1.1 x 1.1 inches and its calculated weight was 1.0 gram. After the heat treatment and cooling the wafer was approximately three sixteenths of an inch thick and it was one and one-eighth inches square. Its weight was approximately 0.84 gram. Thus, there was a definite shrinkage in dimensions and a 16% loss in weight during the heat treatment.

Table V presents data as to the optimum heat treatment times for the molds used in Example II, together with their behavior as to the release of the heat treated instant coffee.

TABLE V

*Optimum Heat Treatment Times and Mold Release Behavior*

| Pan | Time, Minutes | Release |
|---|---|---|
| Tin-plated steel | 5.5 | Tapping required, brushing necessary before reuse. |
| Aluminum | 8.3 | Severe tapping required, brushing necessary before reuse. |
| Steel | 5.8 | Tapping required, gentle brushing necessary before reuse. |
| Steel treated with silicone resin. | 5.7 | Gentle tapping or none required for release. Minimal brushing necessary for reuse. Dry compressed air sufficient for cleaning. |

From the data of Table V, it will be observed that the optimum times for treatment in the tin-plated steel, steel and silicone resin treated steel were substantially the same, with the optimum time of treatment in the aluminum pan being substantially longer. The aluminum pan did not readily release its load of the heat treated instant coffee, while the steel and tin-plated steel released their loads readily. The silicone resin treated steel pan had little or no tendency to retain its load and was definitely superior to the others in this respect.

The moisture adsorption of the wafers prepared as described in Example II, upon exposure to air was determined by periodically weighing wafers exposed to freely circulating air. The data obtained by these determinations is presented by Table VI.

TABLE VI

*Moisture Adsorption of Instant Coffee Wafers Upon Exposure to Atmospheric Conditions*

| Time, Hours | Temp., °F. | Relative Humidity | Adsorbed Moisture, Percent by Weight |
|---|---|---|---|
| 0 | | | 0.00 |
| 0.25 | | | 0.25 |
| 0.5 | | | 0.50 |
| 5 | | | 3.05 |
| 23 | | | 7.34 |
| 30 | | | 8.36 |
| 33 | | | 8.29 |
| 41 | 74.5 | 56.0 | 7.78 |
| 52 | 72.0 | 60.2 | 9.52 |
| 54 | 75.0 | 59.5 | 9.62 |
| 58 | 78.0 | 54.0 | 8.48 |
| 64 | 77.5 | 53.0 | 7.74 |
| 66 | 75.0 | 54.0 | 7.95 |

It will be noted from the data of Table VI that the wafers reached equilibrium with atmospheric conditions in about 30 hours with a moisture absorption of about 8%, by weight. After reaching equilibrium the moisture content of the wafers fluctuated between 7.7% and 9.6% of the wafer weight with fluctuations in the relative humidity.

Although in the foregoing, I have given numerous details as to my improved instant coffee wafers and the method by which they are prepared for the purpose of fully explaining my invention, it will be understood that many changes and variations can be made in these details without departing from the spirit of my invention or the scope of the following claims.

I claim:

1. A method for the production of a solid body of the water-soluble constituents of coffee beans which is freely soluble in water, which is substantially completely free of charred material and which is large enough to produce at least one cup of beverage coffee upon solution in water, which comprises the successive steps of placing a body of powdered, solid, water-soluble constituents of coffee beans in a mold and placing the said mold in a zone having a temperature within the range of about 350° F. to about 550° F. for a period of not less than two minutes, computed by adding one minute to the time for each reduction of the temperature below 550° F. within the range of about 38° F. to 53° F. to substantially completely fuse the said powder without charring it.

2. A method for the production of a solid body of the water-soluble constituents of coffee beans which is freely soluble in water, which is substantially completely free of charred material and which is large enough to produce at least one cup of beverage coffee upon solution in water, which comprises the successive steps of placing a body of powdered, solid, water-soluble constituents of coffee beans in a steel mold having its inner surfaces treated with a silicone resin and a flat lower surface, spreading the said powder into a layer of uniform thickness and placing the mold in a zone having a temperature within the range of about 350° F. to about 550° F. for a period of not less than two minutes, computed by adding one minute to the time for each reduction of the temperature below 550° F. within the range of about 38° F. to 53° F. to substantially completely fuse the said powder without charring it.

3. A method for the production of a solid body of the water-soluble constituents of coffee beans which is freely soluble in water, which is substantially completely free of charred material and which is large enough to produce at least one cup of beverage coffee upon solution in water, which comprises the successive steps of placing an amount of powdered, solid, water-soluble constituents of coffee beans within the range of about 0.9 gram to about 2.4 grams in a mold, and placing the said mold in a zone having a temperature within the range of about 350° F. to about 550° F. for a period of not less than two minutes, computed by adding one minute to the time for each reduction of the temperature below 550° F. within the range of about 38° F. to 53° F. to substantially completely fuse the said powder without charring it.

4. A method for the production of a solid body of the water-soluble constituents of coffee beans which is freely soluble in water, which is substantially completely free of charred material and which is large enough to produce at least one cup of beverage coffee upon solution in water, which comprises the successive steps of placing an amount of powdered, solid, water-soluble constituents of coffee beans within the range of about 0.9 gram to about 2.4 grams in a steel mold having its inner surface treated with a silicone resin and a flat lower surface, spreading the said powder into a layer of uniform thickness, and placing the mold in a zone having a temperature within the range of about 350° F. to about 550° F. for a period of not less than two minutes, computed by adding one minute to the time for each reduction of the temperature below 550° F. within the range of about 38° F. to 53° F. to substantially completely fuse the said powder without charring it.

5. A method for the production of a water-soluble, solid, porous body of fused, water-soluble constituents of coffee beans adapted to be dissolved in a cup of hot water to produce a palatable beverage coffee, which comprises placing an amount of powdered, solid, water-soluble constituents of coffee beans which is an even-numbered multiple of a weight within the range of about 0.9 gram to about 2.4 grams in a steel mold having a flat bottom and parallel sides and having its inner surfaces treated with silicone resin, spreading the said powder into a layer of uniform thickness on the said flat bottom, placing the said mold into a zone having a temperature within the range of about 350° F. to about 550° F. for a period of not less than two minutes, computed by adding one minute to the time for each reduction of the temperature below 550° F. within the range of about 38° F. to 53° F. to substantially completely fuse the said powder without charring it, removing the said mold from the said hot zone and, while the fused sheet in the mold is still in a plastic state, cutting parallel grooves in the surface of the said sheet which divide the surface into the same number of equal areas that the weight of the powder originally placed in the mold was a multiple of a weight within the range of about 0.9 gram to about 2.4 grams, removing the said sheet from the mold and, after it has cooled to room temperature, breaking it along the said grooves.

References Cited in the file of this patent

UNITED STATES PATENTS

| | | |
|---|---|---|
| 1,175,091 | Vietinghoff | Mar. 14, 1916 |
| 1,240,020 | Söderlund | Sept. 11, 1917 |
| 2,457,036 | Epstein | Dec. 21, 1948 |
| 2,826,504 | Chase et al. | Mar. 11, 1958 |

OTHER REFERENCES

"The Condensed Chemical Dictionary," 1956, by Rose et al., Reinhold Publ. Corp. (New York), p. 981.